United States Patent [19]

Lech, Jr.

[11] Patent Number: 4,471,863
[45] Date of Patent: Sep. 18, 1984

[54] MULTI-STAGE TORSIONAL DAMPING DEVICE

[75] Inventor: Thaddeus Lech, Jr., Sterling Heights, Mich.

[73] Assignee: Borg-Warner Corporation, Chicago, Ill.

[21] Appl. No.: 297,445

[22] Filed: Aug. 28, 1981

[51] Int. Cl.³ .................. F16D 3/12; F16D 13/64
[52] U.S. Cl. ................ 192/106.2; 192/70.17; 464/63; 464/68
[58] Field of Search ............ 192/106.2, 70.17; 464/66, 68, 63

[56] References Cited

U.S. PATENT DOCUMENTS

| | | | |
|---|---|---|---|
| 3,101,600 | 8/1963 | Stromberg | 464/68 X |
| 3,428,155 | 2/1969 | Binder et al. | 192/106.2 X |
| 4,101,015 | 7/1978 | Radke | 192/106.2 |
| 4,270,645 | 6/1981 | Beccaris | 192/106.2 X |
| 4,301,907 | 11/1981 | Carpenter et al. | 192/106.2 |
| 4,354,586 | 10/1982 | Stanley | 192/106.2 |

FOREIGN PATENT DOCUMENTS 2040398  8/1980  United Kingdom ............ 192/106.2

Primary Examiner—Rodney H. Bonck
Attorney, Agent, or Firm—James A. Geppert

[57] ABSTRACT

A multi-stage torsional damping device utilized for a clutch driven member comprising a low-rate primary stage to eliminate transmission gear rattle occurring in the neutral transmission position, a medium-rate stage to cushion the torque transference from the low-rate primary stage to a high-rate final stage without impacting the damper parts. The primary stage and second stage are frictionless while the normal high-rate third stage provides friction damping. The device may also have harmonic damping properties to cushion out engine impulses of any differential magnitude that occur during and within its operating range.

6 Claims, 15 Drawing Figures

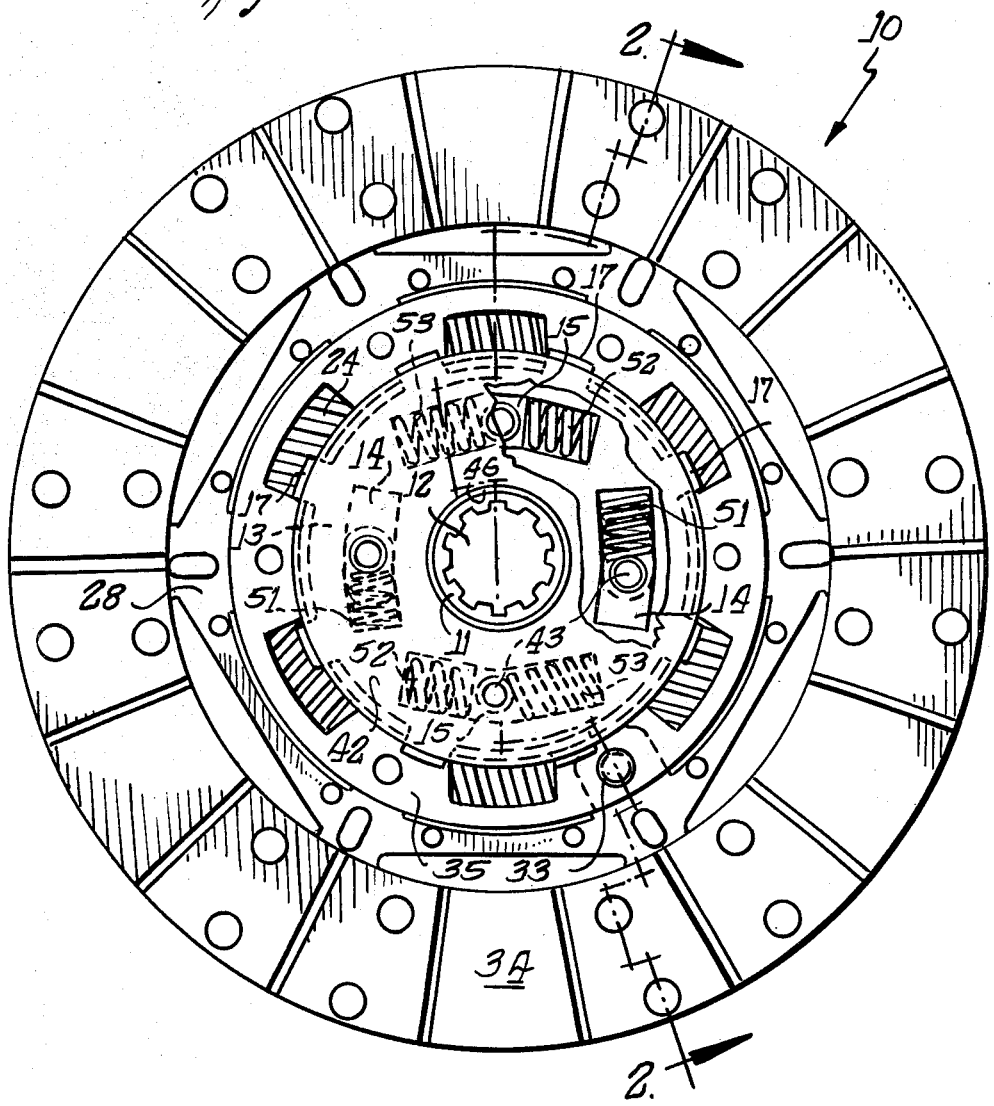

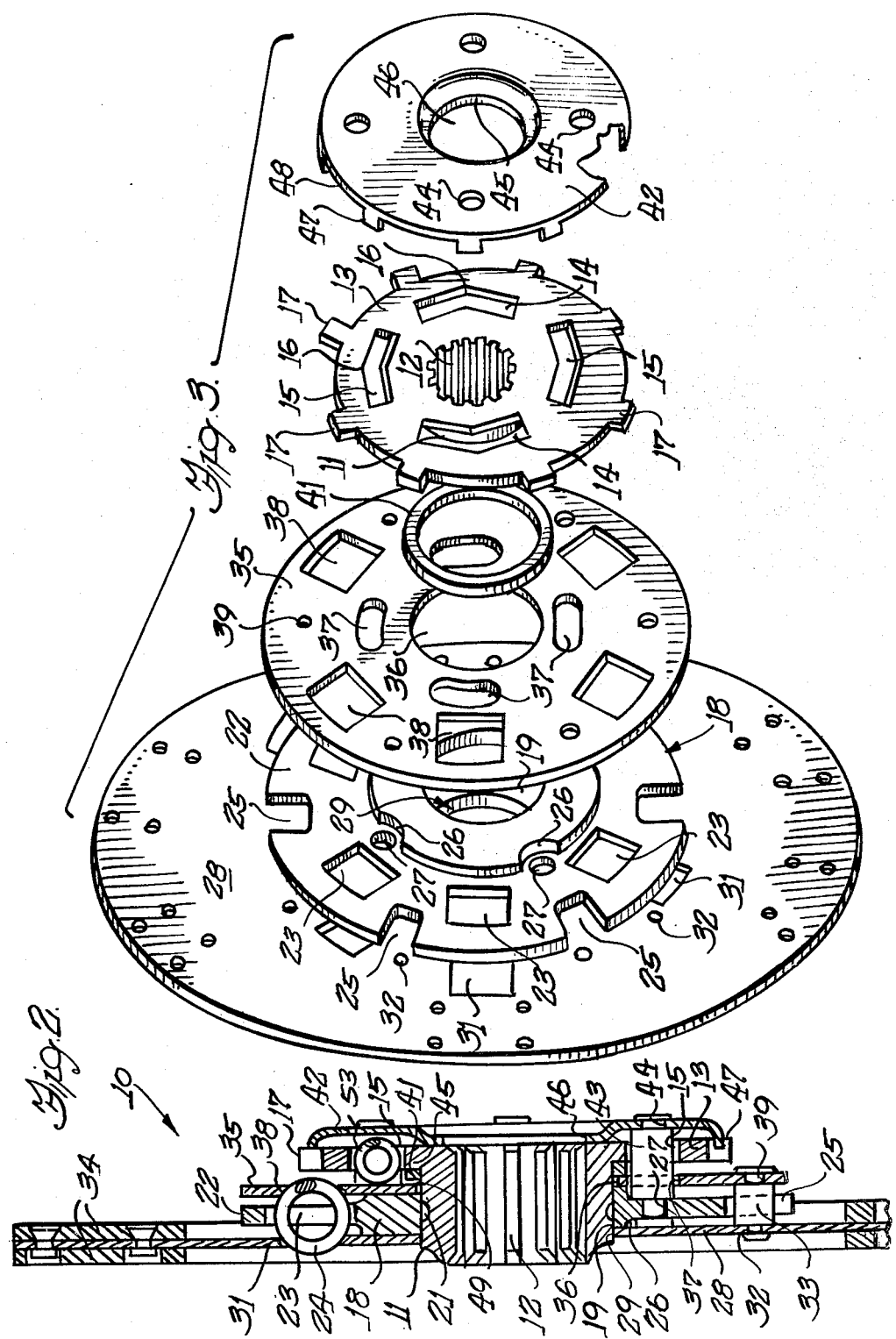

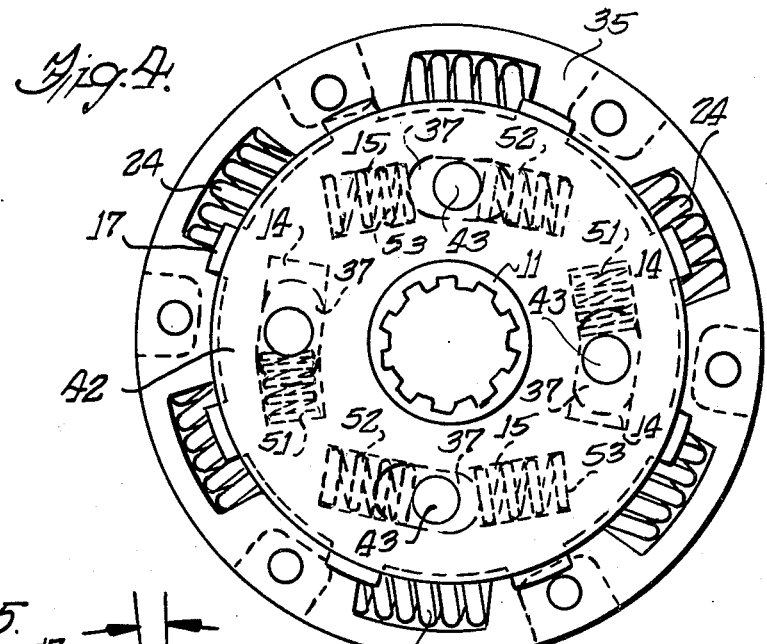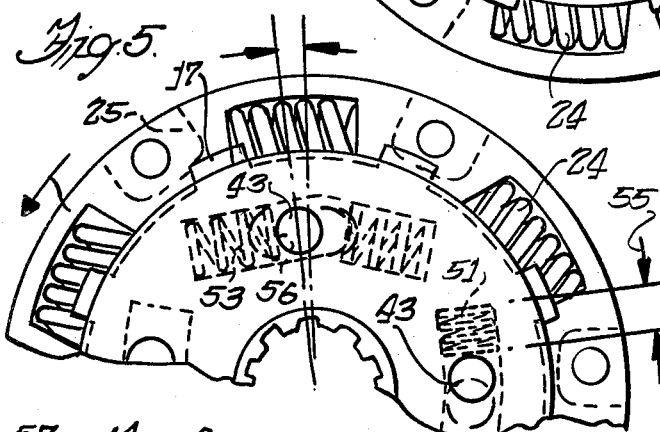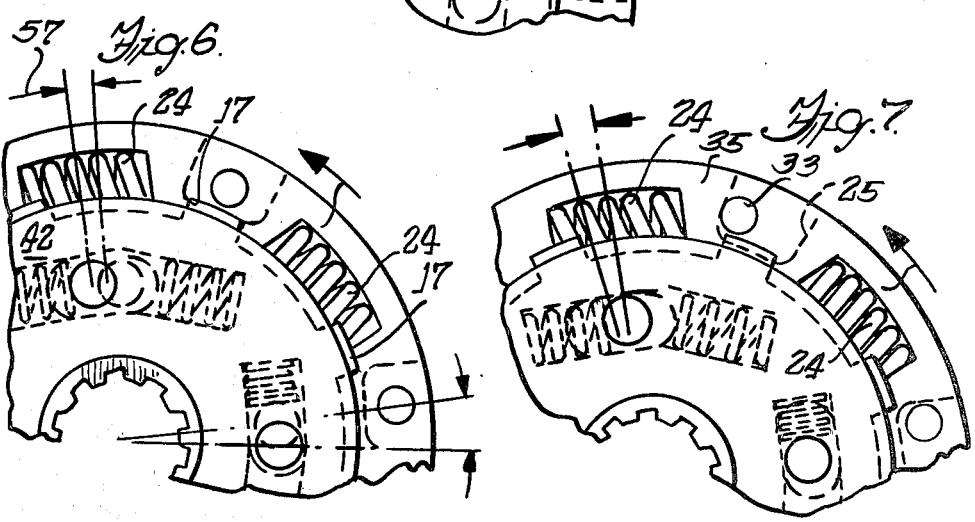

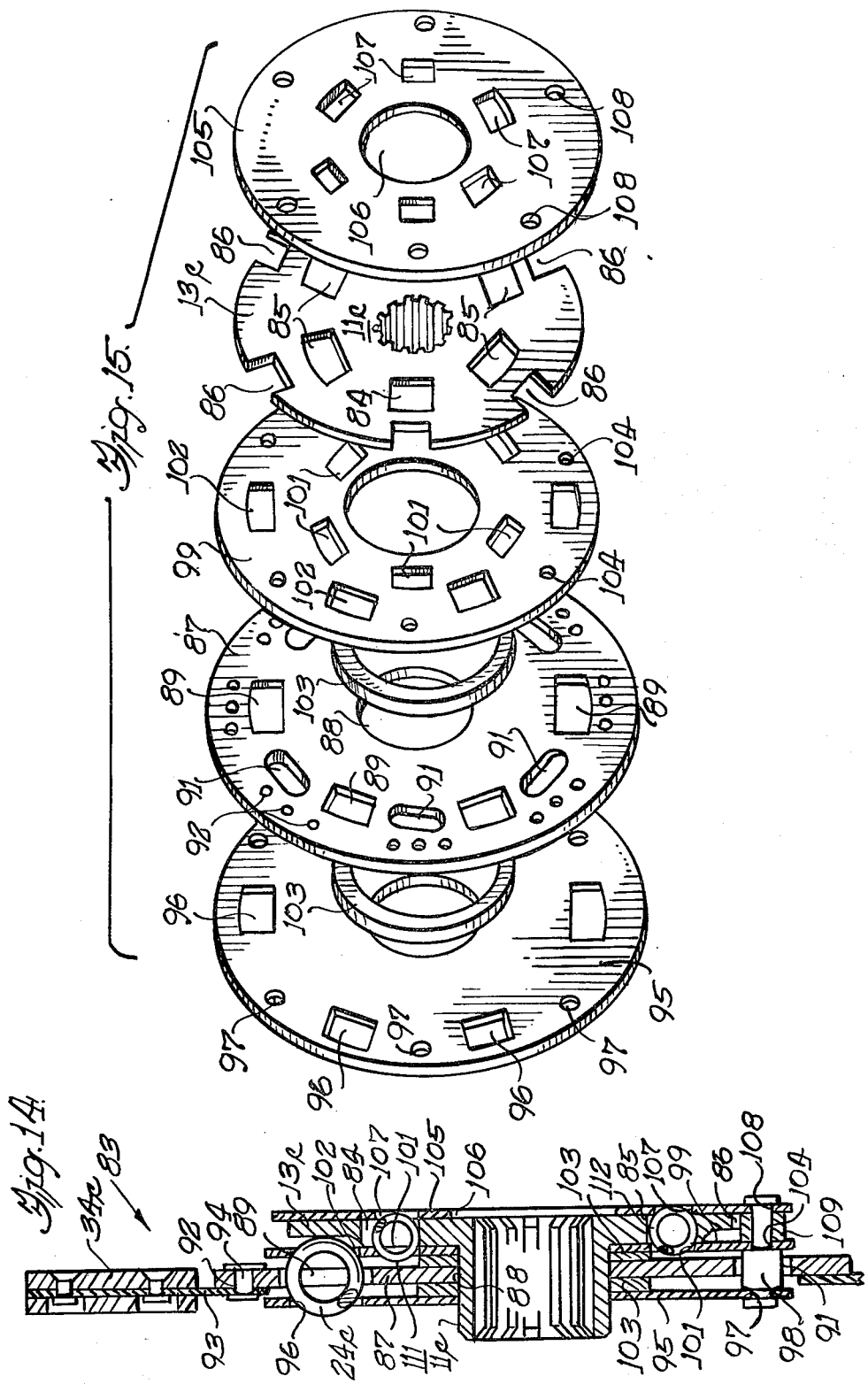

MULTI-STAGE TORSIONAL DAMPING DEVICE

BACKGROUND OF THE INVENTION

Motor vehicle power trains have been troubled with the problem of torsional vibration of the connected elements of the power train both in the neutral transmission position and during operation of the transmission in a drive mode. To neutralize the vibrations emanating from a vehicle engine which would otherwise cause disturbing noises and rattle in the transmission and driveline, a vibration damper has been utilized in the clutch driven plate assembly. A damper arrangement may control the transmission rattle at neutral position or the objectionable noises when the engine drives the vehicle. However, one damper has not been effective to overcome all of the vibration problems, even if a multiple stage damper is used. The present invention overcomes the above vibration problems in a single assembly.

SUMMARY OF THE INVENTION

The present invention contemplates the provision of a novel torsional vibration damper assembly having an inner hub member with a radial flange, an outer hub member journalled on the inner hub member, a first retainer plate and a second retainer plate secured together on opposite sides of the outer hub member and journalled on the inner hub member, first resilient means acting between the outer hub member and said first and second retainer plates to resist relative rotation therebetween, a third retainer plate located on the opposite side of the inner hub flange from the second retainer plate and operatively connected to the outer hub or first and second retainer plates, second resilient means and third resilient means resisting relative rotation between the third retainer plate and inner hub, and stop means limiting the extent of the last-mentioned relative rotation.

The present invention also contemplates the provision of a multi-stage vibration damper assembly having a low-rate first or primary stage, a medium-rate second stage and a high-rate third stage. The first and second stages are frictionless while the third stage includes friction damping. The low-rate first stage is utilized to eliminate transmission gear rattle occurring in the neutral transmission position, while the second stage acts to cushion the torque transference from the first stage to the high-rate third or final stage without impacting the damper parts.

The present invention further comprehends the provision of a multi-stage torsional damping device where the low-rate frictionless first stage to eliminate gear rattle is in series with the medium rate frictionless second stage to cushion impacting of the damper parts and in series with a normal high-rate third stage with friction. The first stage uses the second stage spring as its travel stop, and the second stage then transmits torque until it is grounded out by the hub parts which then transmit torque directly to the third stage, which operates in a normal manner. The cushion effect of the second stage is caused by the spring load overcoming the third stage friction and causing the third stage to move before the second stage is grounded out by the hub parts. The hub parts will squeeze together rather than impact.

The present invention also comprehends the provision of a novel multi-stage torsional damping device having frictionless first and second stages and a high-rate third stage including friction; the device also having harmonic damping properties. The frictionless second stage will cushion out engine impulses of any differential magnitude that occur during and within its operating range. This quality does not exist in a normal damper with friction, and the engine impulses must be greater than the frictional torque or they will be transmitted undiminished through the damper.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 1 is a rear elevational view of a clutch driven plate assembly with portions broken away incorporating the torsional damper of the present invention.

FIG. 2 is a cross sectional view taken on the irregular line 2—2 of FIG. 1.

FIG. 3 is an exploded perspective view of the several plates making up the damper assembly.

FIG. 4 is a partial rear elevational view of the damper assembly in its free position.

FIG. 5 is a partial rear elevational view similar to FIG. 4 but showing the parts in the first stage of operation.

FIG. 6 is a partial rear elevational view showing the parts in the second stage of operation.

FIG. 7 is a partial rear elevational view showing the parts in the third stage of operation.

FIG. 9 is a cross sectional view taken on the irregular line 9—9 of FIG. 8.

FIG. 14 is a cross sectional view of a clutch plate assembly taken on the irregular line 14—14 of FIG. 13.

FIG. 15 is an exploded perspective view of the plates forming the damper assembly of FIG. 13.

DESCRIPTION OF THE PREFERRED EMBODIMENTS

Figure 8:
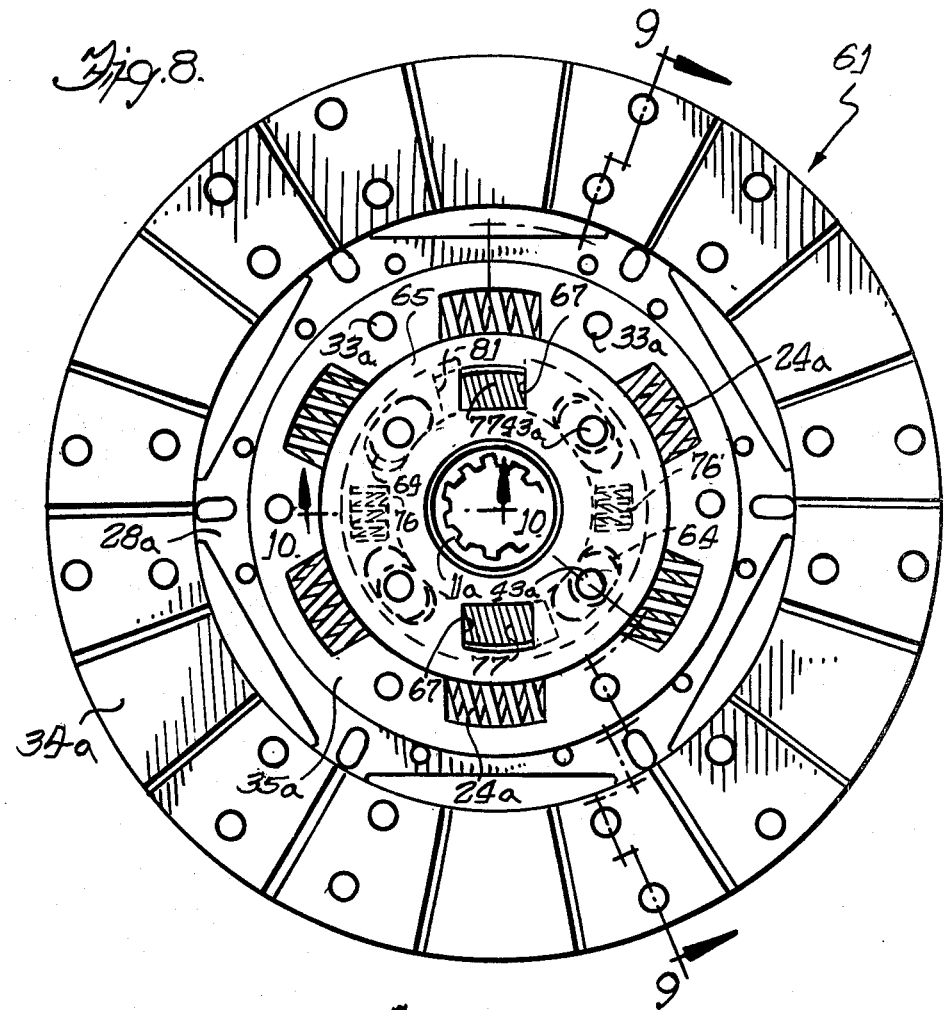
FIG. 8 is a rear elevational view of a clutch plate with a second embodiment of damper assembly.
Figure 10:
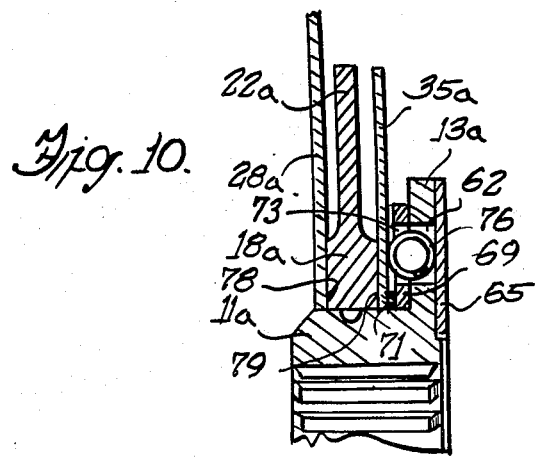
FIG. 10 is a partial cross sectional view taken on the line 10—10 of FIG. 8.
Figure 11:
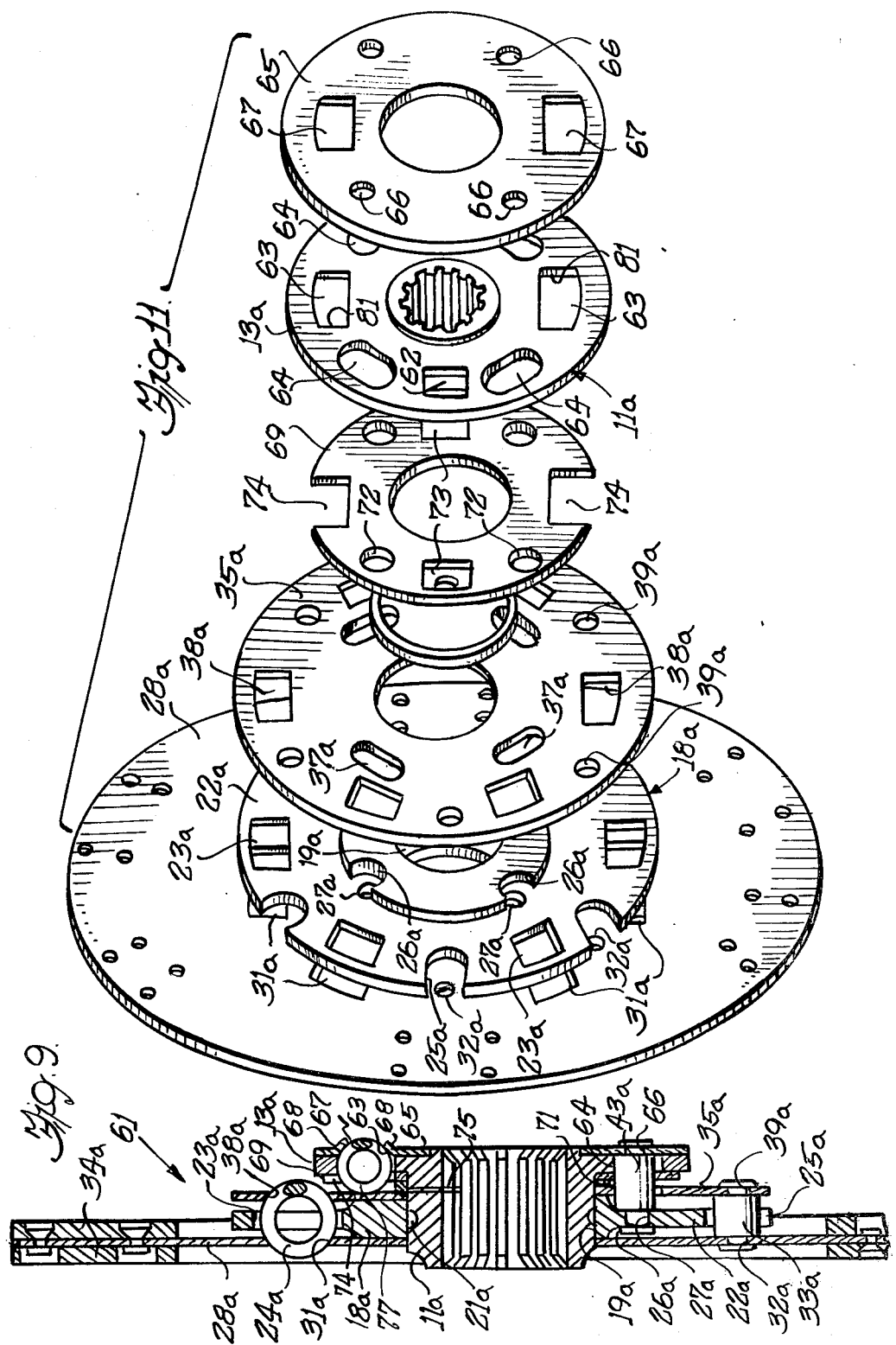
FIG. 11 is an exploded perspective view of the plates forming the damper assembly of FIG. 8.

Referring more particularly to the disclosure in the drawings wherein are shown illustrative embodiments of the present invention, FIGS. 1 through 7 disclose a clutch driven plate assembly 10 including an inner hub 11 having a hub barrel with an internally splined central opening 12 and a radial flange 13 at the rear end of the barrel. The flange is provided with four circumferentially equally spaced elongated slots 14,14 and 15,15, each formed of two arms intersecting at 16 at an obtuse angle of slightly less than 180°. The periphery of the flange is provided with a plurality of circumferentially equally spaced radially extending tangs or ears 17.

An outer hub 18 has a central opening 19 receiving the inner hub 11 and encompassing an annular groove 21 on the hub barrel to receive fretted particles which might otherwise wedge the inner and outer hubs together. The outer hub is piloted on the inner hub by the opening 19 and extends outwardly in a reduced thickness flange 22 with circumferentially equally spaced spring windows or pockets 23 receiving damper springs 24; the periphery of the flange having notches 25 to limit relative rotation as later described. Also, the outer hub is relieved at four circumferentially substantially equally spaced locations 26 for openings 27 located radially between the opening 19 and the spring windows 23.

A clutch driven or first retainer plate 28 has a central opening 29 receiving the inner hub 11, a plurality of spring windows 31 axially aligned with windows 23 and a plurality of openings 32 adjacent the periphery to receive the ends of spacer rivets 33. Clutch facings 34,34 are suitably secured to the opposite surfaces of cushion springs secured to the plate 28 adjacent the periphery thereof. A second retainer plate 35 is positioned on the opposite side of the outer hub 18 from the clutch plate 28 between the hub flange 22 and inner hub flange 13 and has a central opening 36, a plurality of circumferentially equally spaced slots 37, a plurality of spring windows 38 axially aligned with windows 23 and 31, and a plurality of openings 39 receiving the opposite ends of the spacer rivets 33; the spacer rivets extending through the notches 25 in the outer hub flange 22.

As seen in FIG. 2, an annular spacer ring 41 encompasses the inner hub 11 between the second retainer plate 35 and the inner hub flange 13, and a drive cup or third retainer plate 42 is located at the rear end of the hub assembly and secured to the outer hub flange 22 by stop pins 43 extending through the slots 37 in plate 35 and the slots 14 and 15 in the inner hub flange 13; the ends of the stop pins being secured in the openings 27 in the outer hub and openings 44 in the drive cup. The drive cup has a forwardly offset inner periphery 45 engaging the end of the inner hub and defining a central opening 46 and an outer forwardly extending flange 47 slotted at 48 to cooperate with the tangs 17 on the hub flange 13. The drive cup locates the inner hub 11 rearwardly and spacer ring 41 locates it forwardly, establishing end play 49.

A single compression spring 51 is positioned in one arm of each pocket 14 (FIGS. 1 and 4), and compression springs 52,53 are located in the opposite arms of each pocket 15. The springs 51 in pockets 14 and springs 52 and 53 in pockets 15 are trapped between the second retainer plate 35 and the drive cup 42, with the length of the stop pins 43 established so that the springs 51,52,53 will not be squeezed tight between the plates.

In the free position shown in FIG. 4, one pair of stop pins 43 are spaced from springs 53 and rest against springs 52 while the other pair of stop pins are preloaded by springs 51 so that all of the stop pins are centrally located in slots 37 in the second retainer plate 35. With torque applied by clutch engagement when the transmission is in neutral and the engine at idle rpm, the first retainer plate 28 is rotated by the impulses of the engine and rotates the second plate 35 secured thereto. The outer hub 18 is rotated by the plates 28 and 35 through the relatively heavy springs 24 and rotates the drive cup 42 therewith through the stop pins 43. In the first operating stage shown in FIG. 5, the pins 43 travel from their initial position of FIG. 4 to compress springs 51 to a spring load 55 and from the springs 52 to halt at stop or end 56 of springs 53. In the second stage of operation shown in FIG. 6, the pins 43 travel through a range 57 under a spring load for springs 53 and also a small additional load of springs 51 until the tangs 17 are engaged by the flange portions between the slots 48 of drive cup 42 and grounds out the first and second stages through the inner hub 11 and outer hub 18. The third stage shown in FIG. 7 will now operate normally with the damper springs 24 cushioning relative movement of the first retainer plate 28 and second retainer plate 35 to the outer hub 18 until the spacer pins or rivets 33 engage the ends of notches 25 in the outer hub flange 22.

FIGS. 8 through 11 disclose a second embodiment of the present invention with like parts having the same reference numeral with the addition of a script a. This damper assembly 61 includes an inner hub 11a with an integral radial flange 13a having a pair of oppositely disposed small spring pockets 62, a pair of oppositely disposed larger spring pockets 63, and four circumferentially equally spaced slots 64 interposed between the pockets 62 and 63. An outer hub 18a has a central opening 19a encompassing an annular groove 21a in the inner hub barrel to receive fretted particles which might otherwise wedge the inner and outer hubs together. The outer hub has relieved areas 26a for circumferentially substantially equally spaced openings 27a and a radial flange 22a with spring windows 23a for damper springs 24a and notches 25a on the flange periphery.

The clutch or first retainer plate 28a carrying the friction facings 34a at its outer periphery has spring windows 31a axially aligned with windows 23a for springs 24a and openings 32a for the ends of spacer rivets 33a extending through the notches 25a. A second retainer plate 35a has elongated slots 37a for stop pins 43a, spring windows 38a for springs 24a and openings 39a to receive the opposite ends of the spacer rivets 33a. The openings 27a in the outer hub receive one end of each stop pin 43a secured therein while the opposite end of each pin is secured in an opening 66 in a third retainer plate 65 abutting the inner hub flange 13a. The third retainer plate 65 also is provided with a pair of oppositely disposed spring windows 67 aligned with the larger spring pockets 63 in the flange 13a and having inner and outer inclined lips 68.

An inner or fourth retainer plate 69 is loosely mounted on the inner hub 11a between the flange 13a and the second retainer plate 35a and is held in position by shims 71. This plate 69 has pilot holes 72 loosely receiving the stop pins 43a, a pair of oppositely disposed spring windows 73 substantially identical to and aligned with the spring pockets 62 and a pair of oppositely disposed slots or notches 74 aligned with the spring pockets 63. Plate 65 locates inner hub 11a rearwardly and plate 69 and shims 71 locate it forwardly establishing end play 75. Small springs 76 reside in the spring pockets 62 in hub flange 13a and spring windows 73 in plate 69 and are trapped between plate 35a and plate 65. Springs 77 reside in spring pockets 63 in hub flange 13a, windows 67 in plate 65 and notches 74 in plate 69 and are also trapped between plates 35a and 65.

The length of stop pins 43a is established to insure that springs 76 and 77 will not be squeezed between plates 35a and 65, and the plate 69 pilots on the stop pins 43a. Springs 76 are operated by the windows 73 in plate 69 and reacted in pocket 62 in hub flange 13a, while springs 77 are operated simultaneously by slots 74 in plate 69 and windows 67 in plate 65 and are reacted in pockets 63 in flange 13a; the length of the pockets 63 being longer than the length of the windows 67 and slots 74. Springs 76 are self-centering in the windows 73 and pockets 62. Also, the outer hub 18a is squeezed between plates 28a and 35a to create friction at surfaces 78 and 79.

In the free position shown in FIG. 8, the springs 77 rest against the right-hand end of the pocket 63 and are preloaded in position by the springs 76. In the first stage of operation, applied torque will cause rotation of plates 28a, 35a, outer hub 18a and plates 65 and 69 relative to inner hub 11a to compress springs 76 with the springs 77 travelling until they abut stop surfaces 81 in pockets 63. In the second stage operating range, the springs 77 are now compressed and the springs 76 are further compressed for a small additional load until the stop pins 43a stop on slots 64 in hub flange 13a and grounds out the first and second stages through the inner and outer hubs. The third stage with damper springs 24a now operates in the normal manner.

Figure 12:
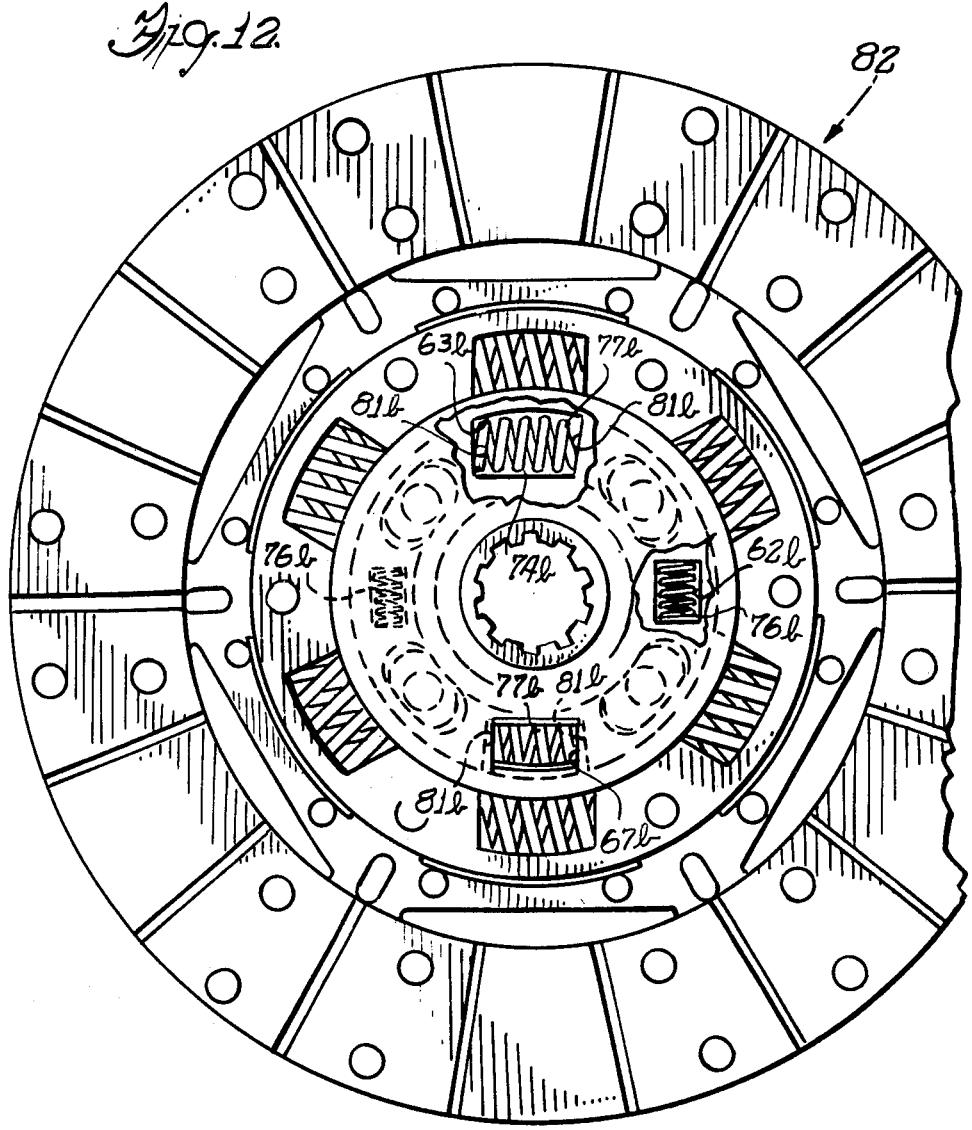
FIG. 12 is a rear elevational view with a portion broken, away of an alternate construction of the damper assembly of FIG. 8.

FIG. 12 discloses an alternative embodiment 82 of the assembly of FIGS. 8–11 with like parts having the same reference numeral with addition of a script b. In this version, the springs 77b are centrally located in pockets 63b in the inner hub flange 13b; the pockets 63b being of greater length than the windows 67b and slots 74b in the plates 65b and 69b, respectively, and the self-centering tendency of springs 76b in spring pockets 62b will maintain this condition. This embodiment operates like the embodiment of FIGS. 8–11 except the first stage is now bi-directional and springs 77b will stop on either side of pockets 63a at stop surfaces 81b to limit its range.

Figure 13:
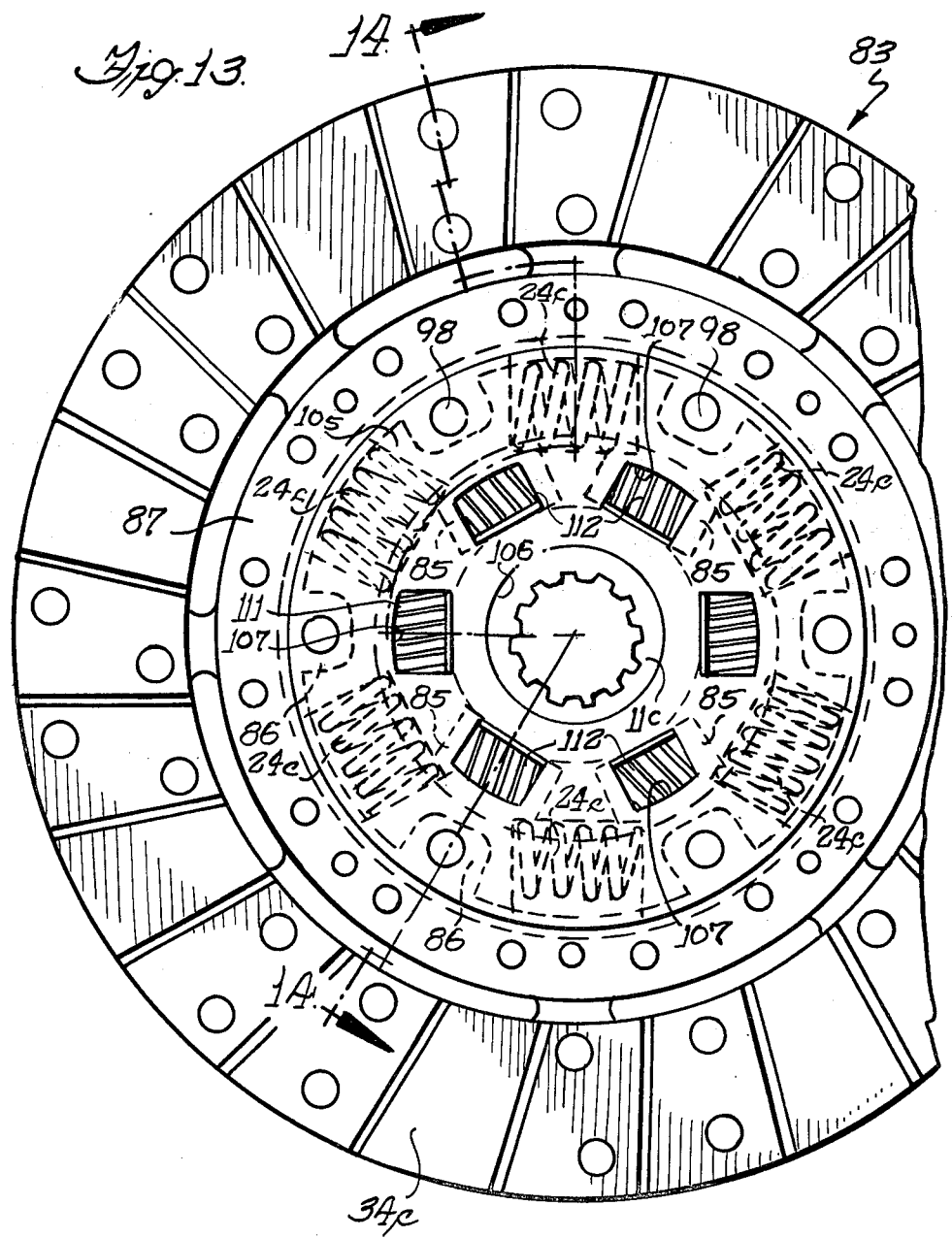
FIG. 13 is a rear elevational view of a clutch plate embodying a third embodiment of damper assembly.

A third embodiment of clutch plate assembly 83 is shown in FIGS. 13–15 wherein like parts having the same reference numeral with a script c. In this embodiment, the inner hub 11c has a radial flange 13c with a pair of oppositely disposed small spring pockets 84 and four larger spring pockets 85 in two oppositely disposed pairs, and the periphery of the flange is provided with a plurality of circumferentially equally spaced notches 86. The outer hub is a flat plate 87 having a central opening 88 receiving the inner hub 11c, a plurality of circumferentially equally spaced spring windows 89 receiving springs 24c alternating with arcuate slots 91, and spaced sets of openings 92 grouped in sets of three adjacent the plate periphery. Cushion springs 93 are secured to plate 87 by rivets 94 in openings 92 and carry the annular clutch facings 34c.

A forward or first retainer plate 95 is journalled on the inner hub 11c and includes spring windows 96 axially aligned with windows 89 in the outer hub and openings 97 receiving one end of each of a plurality of stop pins 98 secured therein. A second retainer plate 99 also is journalled on the inner hub on the opposite side of plate 87 and has six identical spring pockets 101 comparable to pockets 84 and smaller than pockets 85, and a plurality of larger spring windows 102 axially aligned with windows 89 and 96 for the reception of damper springs 24c. Annular plates or rings 103,103 are positioned between the plates 95 and 99 and the outer hub plate 87, with plate 87 being squeezed between plates 95,99 and rings 103,103 to create friction therebetween. The plate 99 also has openings 104 to conformably receive the stop pins 98.

A third retainer plate 105 has a central opening 106 and six identical spring pockets 107 axially aligned with the pockets 101 in central plate 99, and openings 108 in which the opposite ends of stop pins 98 are secured. A spacer or bushing 109 is received on each stop pin 98 and located between the plates 99 and 105 in the notches 86 in the inner hub flange 13c.

A pair of relatively light springs 111 are retained in spring pockets 101 and 107 of plates 99 and 105, respectively, and in pockets 84 in the inner hub flange. Four heavier springs 112 are retained in pockets 101 and 107 of plates 99 and 105 and in pockets 85 in the inner hub flange. In operation, the first stage operates under the spring load of springs 111 for rotational travel until the windows or pockets 85 in the inner hub flange 13c stop on springs 112. The second stage operates with the spring load of springs 112 for rotational travel until the notches 86 stop on spacers 109 on the stop pins 98. The third stage compressing damper springs 24c can now operate in the normal manner. The cushion effect of the second stage results from the spring load overcoming the third stage friction and causing the third stage to move before the second stage is grounded out by the hub parts; the hub parts squeezing together rather than impact. This device also has harmonic damping properties, as the frictionless second stage will cushion out engine impulses of any differential magnitude that occur during and within its operating range. The engine impulses must be greater than the frictional torque or they will be transmitted undiminished through the damper.

I claim:

1. A torsional vibration damper assembly for a clutch driven member comprising an inner hub member operatively connected to a transmission input shaft and having a radial flange, an outer hub member journalled on said inner hub member, a first retainer plate and a second retainer plate secured together on opposite sides of said outer hub member; friction facings carried on one of said first or second retainer plates, first resilient means acting between said outer hub member and said first and second retainer plates for yieldably resisting relative rotation therebetween, a third retainer plate on the side of said inner hub flange opposite said second retainer plate and operatively connected to said outer hub, second resilient means and third resilient means yieldably resisting relative rotation between said third retainer plate and said inner hub member, and a plurality of stop pins secured to said third retainer plate and said outer hub member and extending through slots in said inner hub flange limiting the extend of the last-mentioned relative rotation, said third resilient means engaging several of said stop pins and said second resilient means being spaced from other of said stop pins to provide limited lost motion before the second resilient means are engaged.

2. A torsional vibration damper assembly as set forth in claim 1, in which said inner hub flange terminates at its periphery in a plurality of circumferentially spaced tangs, and said third retainer plate terminates at its outer periphery in an axially extending flange having circumferentially spaced slots receiving said tangs, said tangs and slots permitted a limited amount of relative rotation between said inner hub member and third retainer plate.

3. A torsional vibration damper assembly as set forth in claim 1, wherein said second resilient means comprises a pair of springs received in each of a pair of oppositely disposed slots in said inner hub flange such that a pair of stop pins engage one spring of each pair and are spaced from the other of said pair of springs when the clutch is in a free position.

4. A torsional vibration damper assembly as set forth in claim 3, wherein said third resilient means comprises a relatively light compression spring in each of another pair of oppositely disposed slots in said hub flange.

5. A torsional vibration damper assembly as set forth in claim 4, in which each of said slots receiving the second and third resilient means comprises a pair of slot arms intersecting at an obtuse angle.

6. A torsional vibration damper assembly as set forth in claim 1, in which said stop pins are secured at their opposite ends to said outer hub and said third retainer plate and pass through elongated slots containing said resilient means in said inner hub flange and through slots in said second retainer plate, said first retainer plate carrying said friction facings.

* * * * *

UNITED STATES PATENT AND TRADEMARK OFFICE
CERTIFICATE OF CORRECTION

PATENT NO. : 4,471,863

DATED : September 18, 1984

INVENTOR(S) : Thaddeus Lech Jr.

It is certified that error appears in the above—identified patent and that said Letters Patent is hereby corrected as shown below:

Column 6, line 44, cancel "extend" and insert -- extent --.

Signed and Sealed this

Fifth Day of March 1985

[SEAL]

Attest:

DONALD J. QUIGG

Attesting Officer     Acting Commissioner of Patents and Trademarks